Aug. 13, 1957     F. K. BLOOM     2,802,755
WELD-ELECTRODE AND PRODUCT
Original Filed April 2, 1947
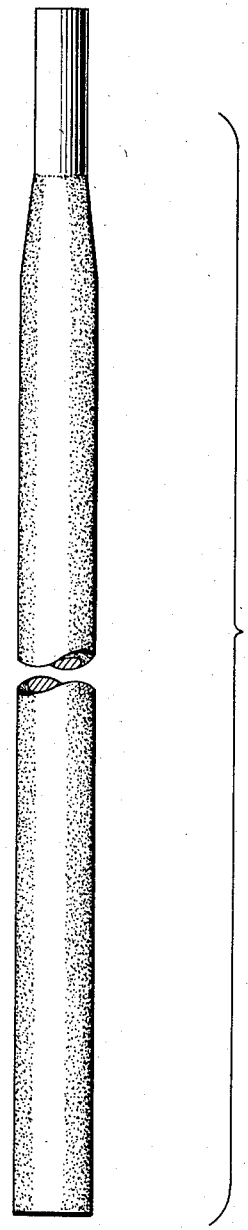
Cr 11.6% – 25.6%
Ni incidentals to 5.5%
Mn incidentals to 14.6%
C 0.15% – 1.30%
Iron remainder; with
Cr exceeding Ni+Mn; and
with % Cr(% Ni + .38(% Mn)
+ 7.5 (% C)) = 61 – 116;
preferably = 61 – 110.
INVENTOR
Fredrick K. Bloom
BY
ATTORNEY United States Patent Office 2,802,755
Patented Aug. 13, 1957

2,802,755
WELD-ELECTRODE AND PRODUCT

Fredrick K. Bloom, Baltimore, Md., assignor to Armco Steel Corporation, a corporation of Ohio Continuation of application Serial No. 738,948, April 2, 1947. This application January 21, 1953, Serial No. 332,531

3 Claims. (Cl. 117—207)

This application is a continuation of my application Serial No. 738,948, filed April 2, 1947, and entitled Electrode and Deposit, now abandoned, and the invention relates to deposit welding, more particularly to an art and manufactures for producing corrosion-resistant hard facings and hard faced products, and to the faced products themselves.

An object of my invention is the provision of hard-facing rods or electrodes which are readily produced and have well balanced ingredients for giving highly satisfactory stainless steel hard-facing weld deposits which are hard as deposited.

A further object is that of providing a simple, direct and thoroughly practical method which is effective and reliable for giving durable, substantially crack-free hard-facing weld deposits.

A still further object of my invention is the provision of hard-faced metal products, as for example those including a carbon steel base, which are highly resistant to corrosion, abrasion and heat, and are substantially free of cracks in the hard facing.

Other objects in part will be obvious and in part pointed out hereinafter.

The invention accordingly consists in the combination and proportionment of elements, composition of materials, and features of construction, and in the several steps and the relation of each of the same to one or more of the others as described herein, the scope of the application of which is indicated in the claims at the end of this specification.

As conducive to a clearer understanding of certain features of my invention it may be noted at this point that deposit welding includes the art of thermally fusing onto a suitable metallic base such as onto old or new carbon steel parts which are to be protected against wear, facing of another metal, as for example a thermally deposited surface, edge, point, or the like better suited for serving desired functions than the underneath metal. These facings achieved by deposit surfacing or welding operations, under certain circumstances represent an easy and economical means for keeping equipment in good operating condition and free of often repeated shut-down for repair or replacement of parts. When of a hard quality, the facings are in demand for serving any of a wide variety of functions as where requirements include resistance to abrasion. Hard facings originally were introduced on such products as metal working dies, oil well drilling tools, certain types of excavating equipment, and the like, but additional uses soon were found, so that now the art of hard deposit surfacing is an important factor involved in many production and maintenance techniques, and in a large variety of specific industries and products.

A great number of the theretofore known hard facings, however, are susceptible to corrosion, the rate being so detrimental where corrosive atmospheres, liquids or solids are encountered that initial cost of including the facing on a particular product cannot be justified. A further difficulty arises in the prior art where during formation of hard facings by deposit welding, the metal has a strong tendency to crack at the interface made with the base metal or between deposited beads of the weld. These detriments too frequently arise by reason of particular composition of the deposited metal. Some of the facings are highly susceptible to cracking because of hot-shortness, this too reverting back to composition of the deposit. The occurrence of cracking usually is responsible for losses in production, often calls for costly replacement of parts because of failure or inadequacy of the cracked hard facing metal, and even becomes so objectionable as to render further use of a given welding composition undesirable for deposit facing purposes.

The question of hardness frequently is a controlling factor with regard to utility of a hard faced article or product; this is particularly so where resistance to abrasion or scour is of considerable importance. It follows, however, that certain of the prior art hard facing materials serve well when exposed to wearing and abrading influences, but fail far too readily where usage includes exposure.

An outstanding object of my invention accordingly is the provision of stainless steel hard-facing rods or electrodes which are easily produced as from the standpoint of producing the metal thereof and working the same to desired shape, and which rods and electrodes give strong, hard facings further having resistance to corrosion and abrasion and substantial freedom from cracking.

Referring now more particularly to the practice of my invention, I provide hard faced metal products of which the facing is a substantially fully martensitic, strong, durable and crack-resistant stainless steel, deposited by thermal fusion. I find advantage in employing a weld rod, illustratively an electrode, having the constituents thereof so proportioned as to melt down and produce the facing, after which the deposit takes on a high hardness or hard set immediately upon cooling in air or by otherwise quenching from the depositing temperature. Although substantially martensitic, the facing also includes small amounts of retained austenite which increase ductility and crack-resistance. Small amounts of ferrite usually are present, this without destroying the property of high hardness. The metal underlying the facing preferably is a plain carbon steel as for example of low, medium or even high carbon grade.

Because of losses which sometimes occur in deposit welding or facing operations and because of other variables, the composition of the facing rod or electrode which I provide is given in terms of the hard facing desirably obtained. The rod or electrode is of such composition as to yield a stainless steel hard facing deposit, comprising about 10% to 22% chromium, nickel from small and fractional percentages under 1% and ranging up to about 5%, from small or incidental amounts up to approximately 10% manganese, about 0.10% to 0.90% carbon, and the remainder substantially all iron. At the same time, however, I restrict the amounts of chromium, nickel, manganese and carbon in the rod to amounts which ensure that the ratio or relationship of these elements in the hard facing obtained is substantially consistent with the terms of the following empirical formula:

$$\text{Percent Cr}\left(\text{Percent Ni} + \frac{\text{Percent Mn}}{2} + 10\,(\text{Percent C})\right)$$

=a numerical value ranging up to approximately 95 maximum, or preferably a numerical value between about 50 and 90. Where the maximum numerical value in the formula is exceeded, the high hardness achieved immediately with cooling the facing from deposit temperature suffers.

The welding rod preferably includes a coated stainless steel wire or powdered metal core having contents of the core and coating sufficient in view of possible losses while forming the deposit, to give hard facings having a composition of the character hereinbefore described which satisfies the formula. I find considerable advantage in making the core from any one of the standard type stainless steels noted below in Table I, any of these steels being readily provided and illustratively, not worked to desired size and shape.

TABLE I

*Stainless steel core compositions*

| Standard Type No. | Percent | | | | | | |
|---|---|---|---|---|---|---|---|
| | C | Cr | Ni | Mn | Si | S | P |
| 410 | 0.15 Max. | 11.50–13.50 | | 1.00 Max. | 1.00 Max. | 0.04 Max. | 0.04 Max. |
| 414 | 0.15 Max. | 11.50–13.50 | 1.25–2.50 | 1.00 Max. | 1.00 Max. | 0.04 Max. | 0.04 Max. |
| 420 | 0.15 Min. | 12.00–14.00 | | 1.00 Max. | 1.00 Max. | 0.04 Max. | 0.04 Max. |
| 430 | 0.12 Max. | 14.00–18.00 | | 1.00 Max. | 1.00 Max. | 0.04 Max. | 0.04 Max. |
| 431 | 0.20 Max. | 15.00–17.00 | 1.25–2.50 | 1.00 Max. | 1.00 Max. | 0.04 Max. | 0.04 Max. |
| 440-A | 0.60–0.75 | 16.00–18.00 | | 1.00 Max. | 1.00 Max. | 0.04 Max. | 0.04 Max. |
| 442 | 0.35 Max. | 18.00–23.00 | | 1.00 Max. | 1.00 Max. | 0.04 Max. | 0.04 Max. |

I coat the metal core with a mineral flux, as by continuously feeding the metal through a suitable flux-extruding die and extruding on the flux. The flux coating preferably is substantially free of hydrogen-yielding constituents, and illustratively includes a dehydrated mineral slag-forming material having a composition of the character more particularly set forth in the copending George E. Linnert application, Serial No. 565,573, filed November 28, 1944, now U. S. Letters Patent No. 2,544,334 of March 6, 1951. For building up the rod composition, I sometimes add amounts of any needed elements to the coating, as for example manganese in the form of powdered ferromanganese or chromium in the form of chromium ferroalloy. Nickel is added as nickel powder and sometimes as nickel oxide. Powdered graphite sometimes is introduced in the coating as a source of carbon. These materials conveniently are applied in mixture with the flux to the core. At times, the coating is substantially all flux, the core for example in this instance being the entire source of metal.

With reasonably good protection from oxidation the recoveries which can be expected of the various alloy ingredients referred to above are as follows: Carbon, 75%; chrominum, 95%; nickel, 100%; manganese, 75%.

Calculation, therefore, reveals that with an average dilution by the base metal of about 25% the rod or electrode composition, including core and coating, comprises about 11.6% to 25.6% chromium, nickel from small and fractional percentages under 1% and ranging up to about 5.5%, from small or incidental amounts up to approximately 14.6% manganese, about 0.15% to 1.30% carbon, and the remainder substantially all iron. At the same time, the amounts of chromium, nickel, manganese and carbon in the rod are further restricted to amounts that asssure that the ratio or relationship of these elements in the hard face obtained is substantially consistent with the empirical formula given above. Expressed in terms of the electrode or rod composition this empirical formula becomes: percent Cr(percent Ni+.38(percent Mn)+7.5(percent C))=a numerical value up to approximately 116 maximum, or preferably a numerical value between 61 and 110.

The stainless steel facings which I achieve therefore include any of the broad percentages of ingredients given hereinbefore so long as the formula ratio of the ingredients does not exceed the numerical value of about 95, this preferably being a value between about 50 and 90.

They gain a martensitic structure and high hardness with cooling in air or otherwise quenching from the temperature used for depositing. The particular combination of ingredients which I employ in depositing the fused-on stainless steel facing further ensures a considerable resistance, by the deposited metal to cracking at the interface with the underneath metal as for example at the interface with a mild steel base. As a matter of still further importance the facing, where produced by depositing beads of the stainless steel as by electric arc welding methods, resists cracking at the points of inter-beading and also resists cracking in use when hot or cold. I usually maintain a minimum of such residual elements as sulphur and phosphorus in the electrode and in the facing obtained, for enhancing the resistance to cracking. The dehydrated mineral flux which I prefer to use, also contributes to freedom from cracking. My stainless steel hard facings resist wear, abrasion, and corrosion under a wide variety of conditions. They are strong, hard, tough and durable.

The uses for the stainless steel hard facings and hard faced products which I achieve are numerous. A large number of uses are satisfactorily served where the hard faced products are exposed to heavy wear or continuous abrasion, particularly in locations where exposure to moisture, damp air, chemicals, gases and other corrosive substances are encountered, or where frequent replacement of machinery parts would be expensive and uneconomical. Several of my hard faced products are gears, pinions, slides and guides for machinery such as engines handling gritty, sandy, sharp ores and earths, as in mining machinery where severe abrasion and acid or chemical-laden waters are encountered. I also produce hard faced products (for example parts for suction dredges and pumps) which are useful where high velocity liquids laden with solids are contacted. In certain instances the products which I achieve fall into a class affording prolonged life, and where the life is extended indefinitely by renewing the stainless steel hard facing from time to time. Other products are scrapers, cylinders and teeth for grain separators, plow shares for sandy or gritty soil, drag chains, cam and screw machine parts, aeroplane tail skids, vises, dies, tongs, and similar seizing and holding equipment. There are of course a vast number of other products falling within the scope of the present invention, the above products being noted for the sake of illustration.

As illustrative of the practice of my invention, I provide an arc welding electrode having a core and a coating, in which electrode or manufacture the carbon, chromium, manganese and nickel are present in such amounts as to yield a deposited facing containing these elements in accordance with any one of the compositions noted below in Table II or in any other proportions approximately consistent with the general composition ranges and formula hereinbefore set forth. The table applies to hard facings which contain carbon, chromium, nickel and manganese, only very small amounts of such elements as sulphur and phosphorus, and the remainder substantially all iron.

TABLE II

*Hard facing compositions*

| No. | Hard Facing Deposit | | | | Formula Ratio | Rockwell Hardness of Deposit |
|---|---|---|---|---|---|---|
| | C | Cr | Ni | Mn | | |
| 1 | 0.11 | 15.51 | 1.99 | 0.70 | 53 | C 42 |
| 2 | 0.24 | 15.54 | 1.99 | 0.68 | 73 | C 49 |
| 3 | 0.12 | 15.18 | 1.83 | 3.95 | 76 | C 41 |
| 4 | 0.16 | 15.25 | 1.83 | 3.71 | 79 | C 42 |

The electrode or rod compositions employed to achieve the hard facing compositions of Table II are given below in Table III.

TABLE III
Weld rod compositions

| No. | C | Cr | Ni | Mn | Formula Ratio |
|---|---|---|---|---|---|
| 1 | 0.16 | 17.99 | 2.19 | 1.02 | 68 |
| 2 | 0.35 | 18.02 | 2.19 | 0.99 | 93 |
| 3 | 0.17 | 17.61 | 2.01 | 5.77 | 96 |
| 4 | 0.23 | 17.69 | 2.01 | 5.42 | 102 |

In use, I fit the electrode into suitable arc welding equipment as for operation on direct current, reverse polarity. The amount of current used is for example in the range of 140 to 160 amperes. For best results the surface of the metal to receive the deposit, is cleaned of all loose scale, dirt, rust or other foreign substances, this by pickling, grinding, machining, wire brushing or the like. Then, by bead deposit welding or any other satisfactory procedure, I employ the electrode for building up a facing on the clean metal base such as on a pre-formed plain carbon steel or high alloy steel product. I deposit a sufficient amount of the metal and then hot file and cold grind or otherwise work the same to desired dimensions. The facing upon cooling, immediately takes on a high hardness.

Hard facings of exceptionally durable and lasting quality are obtained on products of high alloy or low alloy steel, or on other metals or alloys, through the use of my electrodes. Sometimes I deposit the facings on hardening steels or even on hardened steels. Quite often the metal base receiving the facing is not materially responsive to hardening heat treatment, or for other reasons is in the unhardened condition when the hard faced products are put into use.

Thus it will be seen that in this invention there are provided a fusible welding rod as for example an electrode, a method of producing hard facings and hard faced products, and the hard faced products themselves, in which the various objects noted herein together with many thoroughly practical advantages are successfully achieved. It will be noted that the rods or electrodes, are of such metallic contents as to give lasting stainless steel hard facings which are strong, resistant to abrasion and corrosion and also resistant to cracking.

As many possible embodiments may be made of my invention and as many changes may be made in the embodiments hereinbefore set forth, it will be understood that the matter described herein is to be interpreted as illustrative and not as a limitation.

I claim as my invention:

1. A hard facing electrode for the production of a facing which is substantially fully martensitic as deposited comprising a metallic core, and a flux coating thereon, said core and coating essentially consisting of about 11.6% to 25.6% chromium, incidental amounts up to about 5.5% nickel, incidental amounts up to about 14.6% manganese, about 0.15% to 1.30% carbon, with chromium content exceeding the sum of the nickel and manganese contents and said chromium, nickel, manganese and carbon being substantially consistent with the empirical formula: percent chromium (percent nickel+.38 (percent manganese) +7.5 (percent carbon))=a numerical value ranging between 61 and 116, and the remainder substantially all iron.

2. A hard facing electrode for the production of a facing which is substantially fully martensitic as deposited comprising: a stainless steel core, and a dehydrated mineral flux coating on the core, said core and coating essentially consisting of about 11.6% to 25.6% chromium, nickel up to about 5.5%, manganese up to about 14.6%, carbon about 0.15% to 1.30%, with the chromium content exceeding the sum of the nickel and manganese contents and with the chromium, nickel, manganese and carbon all in relationship substantially consistent with the empirical formula: percent chromium (percent nickel+.38 (percent manganese)+7.5 (percent carbon))=a numerical value ranging between 61 and 110 and the remainder substantially all iron.

3. A hard facing electrode for the production of a facing which is substantially fully martensitic as deposited comprising: a hot-worked stainless steel core, and a flux coating thereon, said core and coating together essentially consisting of about 11.6 to 25.6 chromium, nickel up to about 5.5%, manganese up to about 14.6%, carbon about 0.15% to 1.30%, with the chromium content exceeding the sum of the nickel and manganese contents and with the chromium, nickel, manganese and carbon all in relationship substantially consistent with the empirical formula: percent chromium (percent nickel+.38 (percent manganese)+7.5 (percent carbon))=a numerical value ranging between 61 and 110 and the remainder substantially all iron.

References Cited in the file of this patent
UNITED STATES PATENTS

| | | |
|---|---|---|
| 1,893,160 | Clarke | Jan. 3, 1933 |
| 2,050,043 | De Golyer | Aug. 4, 1936 |
| 2,156,298 | Leitner | May 2, 1939 |
| 2,156,299 | Leitner | May 2, 1939 |
| 2,156,307 | Rapatz | May 2, 1939 |
| 2,240,672 | Sherer | May 6, 1941 |
| 2,436,867 | Lee | Mar. 2, 1948 |

OTHER REFERENCES

Welding Metallurgy, 2nd edition (American Welding Society, 1949), pp. 392–400.